Jan. 31, 1950 DE WITT R. GODDARD 2,496,047

ART OF RECORDING AND REPRODUCING
TWO-SIDED MAGNETIC RECORDS
Filed June 18, 1947

INVENTOR
DEWITT R. GODDARD
BY O. Duska
ATTORNEY

Patented Jan. 31, 1950

2,496,047

UNITED STATES PATENT OFFICE 2,496,047

ART OF RECORDING AND REPRODUCING TWO-SIDED MAGNETIC RECORDS

De Witt R. Goddard, Riverhead, N. Y., assignor to Radio Corporation of America, a corporation of Delaware Application June 18, 1947, Serial No. 755,331

2 Claims. (Cl. 179—100.2)

Figures 1, 2, 3, 4, 5:
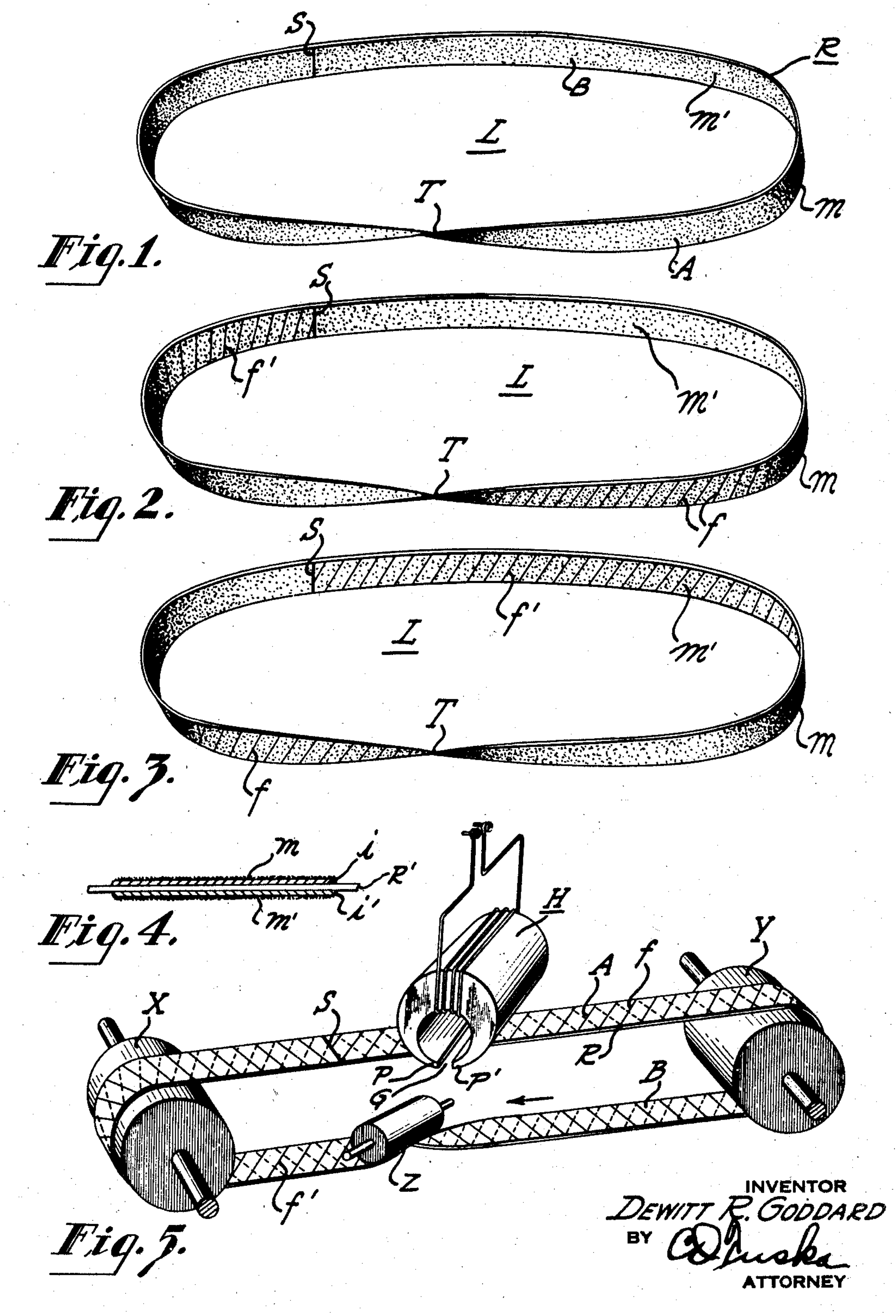

This invention relates to magnetic sound recording and reproducing apparatus and has special reference to the provision of improvements in telegraphones of the type employing so-called "paper tape" records, and to improvements in such records, per se.

Telegraphone records made of paper tape coated with comminuted paramagnetic particles have, by reason of their low cost and ease of handling, largely supplanted records made of solid metal. However, a paper tape record cannot accommodate a recording of a length as great as can be applied to a solid metal tape of the same dimensions. This is so because the former must be magnetized in a "longitudinal" direction and this type of recording requires a much higher tape speed (for the same quality of recording) than does the "perpendicular" type of magnetization commonly used in making records on steel or similar tape.

Accordingly, the principal object of the present invention is to provide an improved paper-tape telegraphone record and one capable of accommodating a longer recording than has heretofore been thought possible of practical achievement with paper-tape records.

Another object of the present invention is to provide an improved method of, and apparatus for, making a relatively long-playing recording on a magnetizable tape record of a relatively short overall length.

Another and important object of the present invention is to provide an improved telegraphone of the type employing a tape-like record, and one suitable for the automatic repetition of advertisements, announcements, notices, explanations, warnings or the like in stores, elevators, vending machines, theatres, traffic intersections, etc.

Another and specific object of the present invention is to provide a tape record which may be played back immediately, i. e. without rewinding the tape.

Still another object of the present invention is to provide an improved two-sided telegraphone record and one wherein the possibility of "cross-talk" between the magnetic signals on the opposite sides of the record is minimized.

The invention will be described in connection with the accompanying drawing wherein: Fig. 1 is a view in perspective of a paper tape-record constructed in accordance with the principle of the invention; Figs. 2 and 3 are similar views in perspective of the tape of Fig. 1 but with the tape marked to show the direction of the magnetic lines of force on its opposite major faces; Fig. 4 is a cross sectional view of a modified tape construction within the invention and Fig. 5 is a partly diagrammatic view in perspective of a telegraphone including a sound-head and reeling system for a tape record, all constructed and arranged in accordance with the principle of the present invention.

The present invention contemplates and its practice provides a telegraphone-record comprising a paper or other non-metallic flexible tape or ribbon R which may be in the form of a closed loop L, having a half-twist T therein and provided on both of its major faces A and B with a sound track constituted of adherent comminuted paramagnetic particles $m$, $m'$. When, as shown in the drawings, the tape is provided with a half-twist and its major faces are joined, front to back, as at S by pasting its ends together, the magnetic major surfaces A and B form a continuous sound-track twice as long as the sound-track on a conventional single-sided tape record of the same length. Furthermore, it is apparent that this "endless" telegraphone-record need not be re-reeled before playing it back and is thus especially suited for the automatic repetition of announcements etc.

In recording (or playing-back) conventional single-sided tape records the magnetic pole-pieces in the "soundhead" are disposed at a right angle to the line of movement of the tape. Such an arrangement might give rise to cross-talk in recording or playing back of the two-sided records of the present invention. Accordingly, referring now to Fig. 5, in carrying the present invention into effect the pole pieces P and P' of the sound head H are arranged at an angle of from say 20° to say 45° with respect to the axis of movement of the tape R. It will be observed that where, as in the instant case, the soundhead is disposed at an angle of 45° with respect to the line of movement of the tape then the magnetic lines of force $f$ (see Fig. 2) and $f'$ (see Fig. 3) on the opposite faces A and B of the tape are at an angle of 90° with respect to each other. At this optimum angle the possibility of interference between the recordings on the opposite sides of the tape is minimized.

In the alternate form of telegraphone record shown in cross-section in Fig. 4 the paper or other non-metallic flexible base R' is provided with one or more layers $i$, $i'$ of soft iron particles or other material having low magnetic retentivity. Such a layer or layers may be said to comprise a "magnetic shield" between the outer magnetically sensitive layers *m* and *m'* and, in any event, retains a minimum amount of the magnetic flux to which the tape is exposed during the recording interval. The intermediate layer or layers *i*, *i'* serve not only to isolate the magnetically active coatings *m* and *m'* but also to improve the performance of the record since the soft iron reduces the reluctance of the air-gap G between the pole pieces P and P' of the recording or play-back head H.

Referring again to Fig. 5, the drive system for moving the two-sided magnetic record of the invention past the sound-head H may comprise simply two spaced apart parallelly arranged pulleys X and Y around which the tape R is driven in an endless path but preferably includes an auxiliary roller Z, or similar guide, disposed at an angle with respect to the pulleys for maintaining the half-twist T in the tape at a predetermined point between X and Y.

It will be observed upon inspection of Fig. 5 that although the splice S in the tape R forms a right angle with respect to the edge of the tape, the angular disposition of the sound-head H causes the splice to approach the air gap G at an angle and thus prevents any disturbing "noise" such as might occur if the splice were to be brought abruptly into register with the said gap.

What is claimed is:

1. In combination, a telegraphone record comprising a non-metallic tape in the form of a closed loop containing a half-twist and having an adherent magnetizable surface layer on both of the major faces of said tape, a magnetic sound-head having a pair of parallelly arranged pole-pieces, and means for sequentially presenting said major faces of said tape to said parallelly arranged pole-pieces at an angle other than a right angle with respect to the axis of movement of said loop.

2. The invention as set forth in claim 1 and wherein said pole pieces form an angle of substantially 45° with respect to said axis of movement of said loop, whereby signal bearing magnetic lines of forces when separately applied by said soundhead to each surface of said loop will form an angle of 90° with respect to each other.

DE WITT R. GODDARD.

REFERENCES CITED

The following references are of record in the file of this patent:

UNITED STATES PATENTS

| Number | Name | Date |
|---|---|---|
| 873,078 | Pederson et al. | Dec. 10, 1907 |
| 1,365,237 | De Forest | Jan. 11, 1921 |
| 1,442,682 | De Forest | Jan. 16, 1923 |
| 1,847,860 | Best | Mar. 1, 1932 |
| 1,974,935 | Troland | Sept. 25, 1934 |
| 2,041,144 | O'Neil | May 19, 1936 |
| 2,115,503 | Von Mihaly | Apr. 26, 1938 |
| 2,183,117 | Daniel | Dec. 12, 1939 |
| 2,188,650 | Clark | Jan. 30, 1940 |
| 2,217,468 | Hertzig | Sept. 24, 1940 |
| 2,238,863 | Hertzig | Feb. 24, 1942 |
| 2,344,615 | James | Mar. 21, 1944 |
| 2,351,007 | Camras | June 13, 1944 |
| 2,352,023 | Schuller | June 20, 1944 |

FOREIGN PATENTS

| Number | Country | Date |
|---|---|---|
| 587,916 | Germany | Nov. 10, 1933 |